United States Patent [19]

Jackson

[11] Patent Number: 5,352,496
[45] Date of Patent: * Oct. 4, 1994

[54] COLOR MATCH MOLDING AND BELT WEATHER STRIP

[75] Inventor: Norman C. Jackson, Livonia, Mich.

[73] Assignee: The Standard Products Company, Cleveland, Ohio

[*] Notice: The portion of the term of this patent subsequent to Aug. 28, 2009 has been disclaimed.

[21] Appl. No.: 937,532

[22] Filed: Aug. 28, 1992

Related U.S. Application Data

[63] Continuation of Ser. No. 570,008, Aug. 20, 1990, Pat. No. 5,151,307, which is a continuation of Ser. No. 246,511, Sep. 19, 1988, Pat. No. 4,975,306.

[51] Int. Cl.$^5$ .............................................. B60J 10/02
[52] U.S. Cl. ..................................... 428/31; 49/490.1; 428/90; 428/122; 428/358
[58] Field of Search ................ 428/31, 90, 122, 358; 49/490.1; 293/128; 296/93

[56] References Cited

U.S. PATENT DOCUMENTS

| | | | |
|---|---|---|---|
| 3,310,928 | 3/1967 | Weimar | 558/233 |
| 3,825,459 | 7/1974 | Taylor | 156/257 X |
| 4,052,497 | 10/1977 | Monnet | 264/255 |
| 4,130,535 | 12/1978 | Coran et al. | 428/903.3 X |
| 4,268,552 | 5/1981 | Duvdevani et al. | 428/31 |
| 4,308,302 | 12/1981 | Etter et al. | 428/122 X |
| 4,328,273 | 5/1982 | Yackiw | 428/122 |
| 4,358,482 | 11/1982 | Jubelt | 428/31 X |
| 4,371,583 | 2/1983 | Nelson | 428/31 X |
| 4,381,273 | 4/1983 | Azzola | 428/122 X |
| 4,411,938 | 10/1983 | Madonia et al. | 428/31 |
| 4,411,941 | 10/1983 | Azzola | 428/122 |
| 4,419,844 | 12/1983 | Kreisfeld | 49/475 |
| 4,434,598 | 3/1984 | Adell | 52/716.5 |
| 4,438,162 | 3/1984 | Nelson | 428/31 X |
| 4,472,469 | 9/1984 | Thies | 428/122 |
| 4,495,234 | 1/1985 | Tominaga et al. | 428/122 |
| 4,513,044 | 4/1985 | Shigeki et al. | 428/122 |
| 4,576,773 | 3/1986 | Azzola et al. | 264/167 |
| 4,603,899 | 8/1986 | Iwasa | 428/122 X |
| 4,617,220 | 10/1986 | Gimster | 428/122 |
| 4,619,077 | 10/1986 | Azzola et al. | 49/497 |
| 4,634,735 | 1/1987 | Thiersault et al. | 428/31 X |
| 4,654,257 | 3/1987 | Murachi | 428/31 X |
| 4,654,262 | 3/1987 | Alonso | 428/345 |
| 4,701,376 | 10/1987 | Hermann et al. | 428/31 X |
| 4,708,351 | 11/1987 | Midooka et al. | 428/122 X |
| 4,765,936 | 8/1988 | Ballocca | 264/46.1 |
| 4,778,550 | 10/1988 | Barton et al. | 428/31 X |
| 4,780,345 | 10/1988 | Gray | 428/31 X |
| 4,783,931 | 11/1988 | Kirkwood | 428/122 X |
| 4,810,540 | 3/1989 | Ellison et al. | 428/31 |
| 4,937,126 | 6/1990 | Jackson | 428/122 |
| 4,943,466 | 7/1990 | Bareich | 428/122 |
| 4,949,507 | 8/1990 | Vaughan | 428/122 X |
| 4,975,306 | 12/1990 | Jackson | 428/31 |
| 5,018,308 | 5/1991 | Vaughan | 428/122 X |
| 5,151,307 | 9/1992 | Jackson | 428/31 |

FOREIGN PATENT DOCUMENTS

| | | | |
|---|---|---|---|
| 1342216 | 9/1963 | France . | |
| 7307951 | 10/1974 | France . | |
| 1459504 | 12/1976 | United Kingdom | 428/122 |

Primary Examiner—Henry F. Epstein
Attorney, Agent, or Firm—Harness, Dickey & Pierce

[57] ABSTRACT

A molding for attachment to a vehicle includes a support member and a first colored layer secured to the support member. A second colored layer is abutted to the first colored layer at one edge thereof, and secured to the support member. The first and second colored layers are of similar colors presenting a color matched molding.

10 Claims, 1 Drawing Sheet

COLOR MATCH MOLDING AND BELT WEATHER STRIP

This is a continuation of U.S. patent application Ser. No. 07/570,008, filed Aug. 20, 1990, now U.S. Pat. No. 5,151,307, which is a continuation of U.S. patent application Ser. No. 246,511, filed Sep. 19, 1988 now U.S. Pat. No. 4,975,306 issued Dec. 4, 1990.

BACKGROUND OF THE INVENTION

The present invention relates to a molding for attachment to a vehicle. More particularly, the present invention relates to a molding and weatherstrip which can be color matched to the surface of a vehicle.

Moldings or weather strips are well known for use with automotive vehicles and are typically made of synthetic elastomeric materials because of the desirable physical properties of such materials. Such moldings are generally black in color, however, because of difficulties encountered when elastomeric material is colored or painted. Colored weatherstrips are, however, known. For example, U.S. Pat. No. 4,513,044, issued Apr. 23, 1985, to Shigeki et al. discloses a trim portion having an outer surface covered by a colored solid rubber layer having a color. All parts of the weather strip are taught to be formed from the same kind of rubber, such as EPDM or NBR. Colored elastomeric material generally does not present a high-gloss appearance. The color does not hold and the elastomeric material has a dull appearance. Thus, heretofore it has not been possible to match the typical high gloss surface color of vehicles with colored elastomeric materials.

SUMMARY OF THE INVENTION

A molding for attachment to a vehicle includes a support member having a first colored layer secured on one portion thereof and a second colored layer secured on another portion thereof. The first and second colored layers can be of similar colors presenting an integral color matched molding.

In addition, a method is provided for making a colored molding for attachment to a vehicle including the steps of forming a metallic support member to a predetermined configuration by rolling; securing a first colored layer to a surface portion of the support member and securing a second colored layer to a different surface portion of the support member. The first and second colored layers are preferably of similar colors and the first colored layer preferably is of a color which color matches the exterior color of the vehicle to which it is to be attached. The subject invention provides a colored molding which matches the surface color of the vehicle and can present a high-gloss finish.

Other advantages of the present invention will be readily appreciated as the same becomes better understood by reference to the following detailed description when considered in connection with the accompanying drawings.

DESCRIPTION OF THE PREFERRED EMBODIMENT

Figure 1:
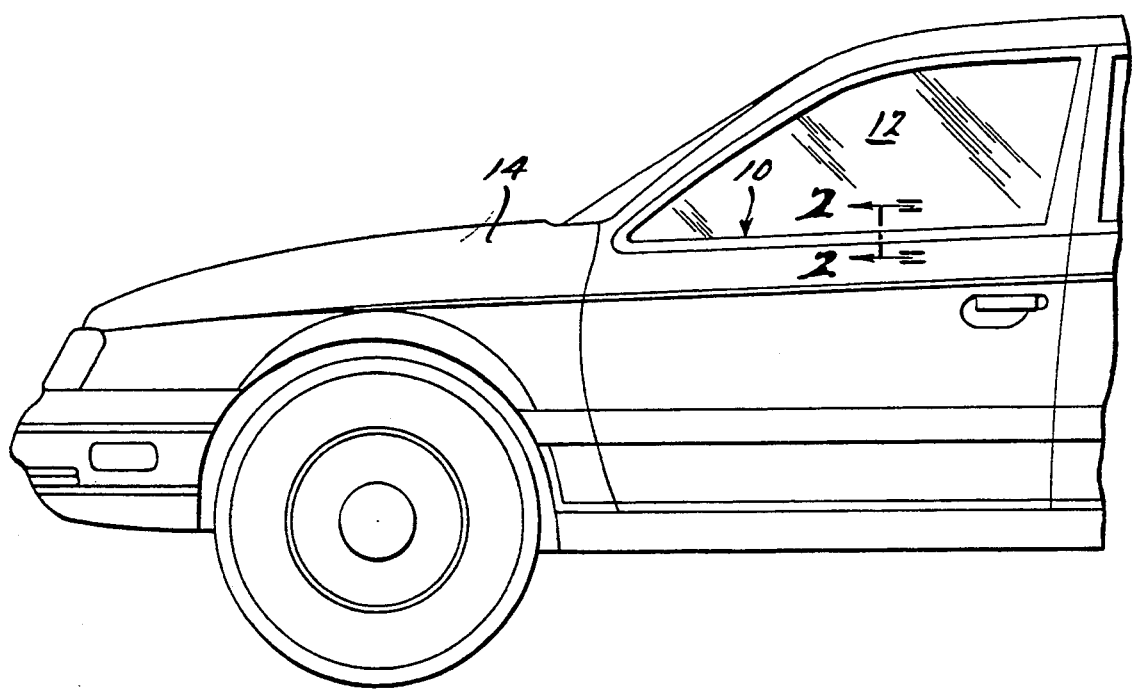
FIG. 1 is an elevational view of a preferred embodiment of the molding of the subject invention attached to a vehicle shown broken away.
Figure 2:
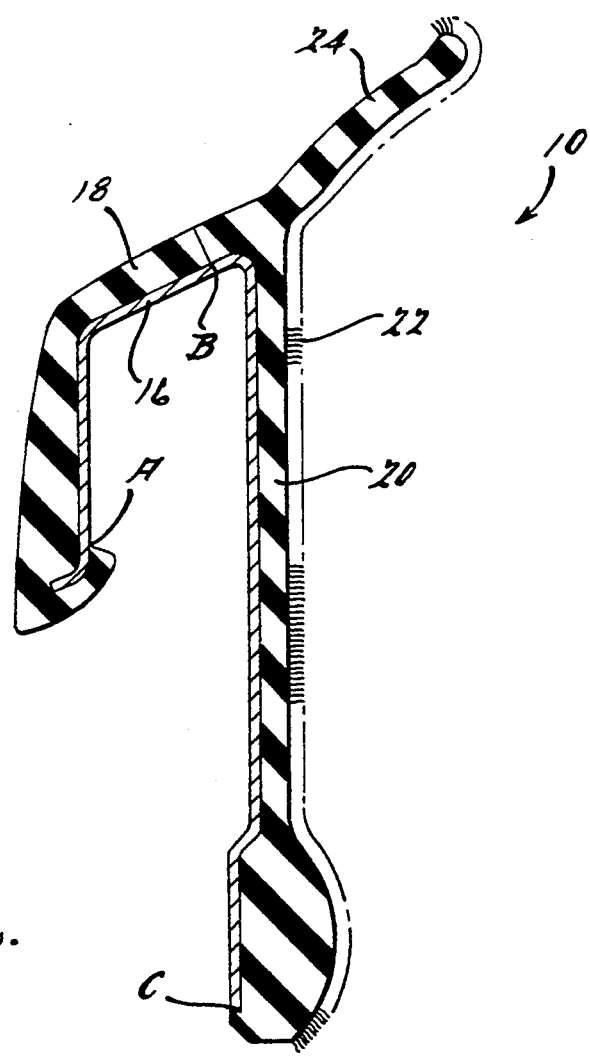
FIG. 2 is a sectional view taken along line 2—2 of FIG. 1.

A preferred embodiment of a weather strip or molding for attachment to a vehicle is generally shown at 10 in FIGS. 1 and 2. The molding 10 is typically a belt weather strip at the bottom of the window 12 of the vehicle 14. The molding 10 includes a metal support member 16 which is generally U-shaped in cross-sectional configuration with one leg longer than the other. A first colored layer 18 is secured to one side of the support member 16. The first colored layer 18 is made of a PVC material having a shore "A" durometer of 86±5. A first adhesive, such as "A1104B", commercially available from B. F. Goodrich, is used to secure the first colored layer 18 to the support member 16. The first adhesive is applied from point A to B on the support member 16.

The molding 10 includes a second colored layer 20 which abuts one end of the first colored layer 18 at B and which is secured to the same side surface of the support member 16 as the first colored layer 18. The second colored layer 20 is made of a thermoplastic elastomer material, i.e., a TPE such as "Santoprene #101-64", commercially available from the Monsanto Chemical Company. A second adhesive, such as "Mor-Ad P80", commercially available from Morton Thiokol, Inc., is applied from point B to C on the support member 16 and secures the second colored layer 20 to the support member 16. TPE comprises rubber and plastic and has the characteristics of a thermoplastic material while also having compression set properties comparable to rubber. Thus TPE is an effective seal. Preferably the TPE is ultraviolet (UV) light stabilized. Also preferably the first and second colored members 18 and 20 have a color similar to each other.

PVC can be made to color match the vehicle body paint, including metallics and high-gloss body paint. Layer 18 which is presented to the outside of the vehicle can thus color match the vehicle body paint. PVC is not a good material for seals because it has poor compression set properties but layer 18 does not have a sealing function. TPE is presently limited to black and lower gloss non-metallic colors. However, layer 20 is presented largely interior of the door. Still, the sealing lip 24 of second colored layer 20 can be made of a color compatible to the vinyl color.

The molding 10 further includes a flock material or low friction coating 22 secured in a conventional manner to a portion of one side of the second colored layer 20.

Accordingly, a method is provided for making a colored molding 10 for attachment to a vehicle 14. The method comprises the steps of forming a support member 16 to a predetermined configuration, such as a U-shape, by roll-forming. The steps include securing a first colored layer 18 to the support member 16 and securing a second colored layer 20 to the support member 16. The steps also include matching the first 18 and second 20 colored layer to have similar colors. The method further includes extruding the first colored layer 18 of a polymeric material such as PVC and extruding the second colored layer 20 of an elastomeric and polymeric material such as Santoprene. The steps further include applying a first and second adhesive selectively along the core member 16 to secure the first 18 and second 20 colored layers to the support member 16, respectively.

The method also includes heating the core member 16 and adhesives to a predetermined temperature and bonding the first 18 and second 20 colored layers to the support member 16 by curing the adhesives. The steps may further include applying a slip coat on a portion of the second colored layer 20 by, for example, priming one side of the second colored layer 20 and applying a third adhesive over the primer and securing a flock material 22 with the third adhesive to the second colored layer 20. The method also includes extruding the first color layer of a high gloss PVC and/or PVC of metallic colors to provide a match to body and trim appearance.

The invention has been described in an illustrative manner, and it is to be understood that the terminology which has been used is intended to be in the nature of words of description rather than of limitation. Obviously, many modifications and variations of the present invention are possible in light of the above teachings. It is, therefore, to be understood that within the scope of the appended claims, the invention may be practiced otherwise than as specifically described.

What is claimed is:

1. A belt weather strip for attachment to a vehicle, said vehicle having a surface appearance which is to be matched in appearance by said weather strip, said weather strip comprising:
   a generally 'U' shaped support member;
   a first selected layer secured to said support member;
   a second selected elastomeric layer secured to said support member; and said first and second selected layers having similar appearances matching the surface appearance of the vehicle wherein said second selected elastomeric layer forms a sealing lip.

2. A belt weather strip as set forth in claim 1 characterized by said first and second layers being of similar colors.

3. A belt weather strip as set forth in claim 1 further characterized by said support member comprising a metal material and having a U-shaped configuration.

4. A belt weather strip as set forth in claim 3 including an adhesive for securing said first layer to one side of said support member.

5. A belt weather strip as set forth in claim 4 including an adhesive for securing said second layer to said one side of said support member.

6. A belt weather strip as set forth in claim 5 including a low friction material on one side of said second layer.

7. A belt weatherstrip as set forth in claim 6 wherein said low friction material is a flock material.

8. A belt weather strip as set forth in claim 1 wherein said first layer has a high gloss appearance matching a corresponding appearance of the surface of the vehicle.

9. A belt weather strip for attachment to a vehicle, said vehicle having a surface appearance, said strip comprising:
   a metal support member having a U-shaped configuration;
   a first colored layer secured to one side of said support member;
   a second colored layer abutting one end of said first colored layer and secured to the same side of said support member as said first colored layer, said second color layer including a sealing lip extending therefrom;
   a first adhesive for securing said first colored layer to said support member;
   a second adhesive for securing said second colored layer to said support member;
   said first colored layer having a color similar to said second colored layer which match the surface appearance of the vehicle; and
   low friction material secured to one side of said second colored layer.

10. A belt weather strip comprising:
    a generally 'U' shaped support member;
    a first layer of a PVC material secured to said support member via an adhesive during extrusion thereof over said support member, said first layer having a first finished surface for matching a surface of a vehicle; and
    a second layer of a polymer material secured to said support member via an adhesive during extrusion thereof, said second layer being adjacent said first layer on said support member, said second layer having a second finished surface for matching a surface of said vehicle; said second layer including a sealing lip extending therefrom.

* * * * *